United States Patent
Fujimoto

(10) Patent No.: US 10,120,627 B2
(45) Date of Patent: Nov. 6, 2018

(54) PROCESSING DEVICE, NON-TRANSITORY RECORDING MEDIUM STORING A COMPUTER READABLE PROGRAM AND SUBSTITUTE PROCESS SETTING METHOD

(71) Applicant: Konica Minolta, Inc., Tokyo (JP)

(72) Inventor: Naomi Fujimoto, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/707,525

(22) Filed: Sep. 18, 2017

(65) Prior Publication Data

US 2018/0107435 A1 Apr. 19, 2018

(30) Foreign Application Priority Data

Oct. 14, 2016 (JP) ................................. 2016-202303

(51) Int. Cl.
*G06F 3/12* (2006.01)
*G06F 3/0486* (2013.01)
*G06F 3/0481* (2013.01)

(52) U.S. Cl.
CPC ............ *G06F 3/126* (2013.01); *G06F 3/0486* (2013.01); *G06F 3/04817* (2013.01); *G06F 3/1205* (2013.01); *G06F 3/1226* (2013.01); *G06F 3/1264* (2013.01)

(58) Field of Classification Search
CPC combination set(s) only.
See application file for complete search history.

(56) References Cited

FOREIGN PATENT DOCUMENTS

JP 2003-050687 A 2/2003

*Primary Examiner* — Helen Zong
(74) *Attorney, Agent, or Firm* — Squire Patton Boggs (US) LLP

(57) ABSTRACT

Disclosed is a processing device, including: an operation panel; a hardware processor that: executes a designated process; obtains information for displaying an operation window of the another processing device, and displays an operation window of the processing device and the operation window of the another processing device on the operation panel of the processing device; carries out a substitute setting for instructing the another processing device to substitutionally execute a process relating to an operation button moved to the operation window of the processing device when an operation for moving the operation button displayed in the operation window of the another processing device to the operation window of the processing device is received; and instructs the another processing device to substitutionally execute the process relating to the operation button for which the substitute setting is carried out.

14 Claims, 17 Drawing Sheets

PROCESSING DEVICE, NON-TRANSITORY RECORDING MEDIUM STORING A COMPUTER READABLE PROGRAM AND SUBSTITUTE PROCESS SETTING METHOD

Japanese Patent Application No. 2016-202303 filed on Oct. 14, 2016, including description, claims, drawings, and abstract the entire disclosure is incorporated herein by reference in its entirety.

BACKGROUND

Technological Field

The present invention relates to a processing device, a non-transitory recording medium storing a computer readable program and a substitute process setting method which can instruct another processing device to substitutionally execute a process.

Description of the Related Art

In recent years, a system in which a plurality of multi function peripherals having a plurality of functions, such as a copy function, a print function, a scan function, a facsimile function and the like, a plurality of devices each of which has only one function, such as a printer, a scanner, a facsimile device or the like, are connected via a network, is provided. In such as system, there are some cases in which the system can be set so as to instruct another device to substitutionally execute a job entered in one device or a process relating to a predetermined function for executing the entered job.

However, in a conventional technology, in order to instruct another device to substitutionally execute the job or the like, firstly, it is necessary that the device for substitutionally executing the job or the like, is selected. Further, it is necessary that a list of the functions of the selected device is displayed to select the intended function from the list of the functions. Because it is difficult for a user to recognize the relation between the list and each function button in the operation window, this technology is not convenient for the setting operation for instructing another device to substitutionally execute the job or the like.

In Japanese Patent Application Publication No. 2003-50687, the following printer driver is disclosed. In the printer driver, the configuration information of each of a plurality of printers connected via a network (in particular, the information indicating the paper sheets set to the sheet feeding cassette of each device) is obtained to prepare the new configuration information by merging the obtained configuration information. Then, the window is displayed in accordance with the new configuration information to instruct a user to select the cassette to which the intended paper sheets are set. The user transmits a print job to a printer having the selected cassette.

By applying the technology disclosed in Japanese Patent Application Publication No. 2003-50687 to the setting of the substitute process, the operation window including the functions of all of the devices on the network is automatically prepared. As compared with the case in which the device for substitutionally executing the job or the like, is selected and a list of the functions of the selected device is displayed to select the intended function from the list of the functions, the convenience of the system is improved.

However, when the information of the functions of all of the devices is merged, the information of the functions which are not necessary for a user is also merged. Therefore, the operation window is complicated and the operability for selecting the intended function is decreased.

SUMMARY

One of the objects of the present invention is to provide a processing device, a non-transitory recording medium storing a computer readable program and a substitute process setting method which can instruct another device to substitutionally execute a process relating to the intended function by a simple operation.

To achieve at least one of the abovementioned objects, according to an aspect of the present invention, a job execution device reflecting one aspect of the present invention, comprises:

an operation panel having a display and an operation receiver;

a communicator that communicates with another processing device via a network; and a hardware processor that:

executes a designated process;

obtains information for displaying an operation window of the another processing device, and displays an operation window of the processing device and the operation window of the another processing device on the operation panel of the processing device so as to arrange the operation window of the processing device and the operation window of the another processing device;

carries out a substitute setting for instructing the another processing device to substitutionally execute a process relating to an operation button moved to the operation window of the processing device when an operation for moving the operation button displayed in the operation window of the another processing device to the operation window of the processing device is received in a situation in which the operation window of the processing device and the operation window of the another processing device are arranged and displayed on the operation panel of the processing device; and instructs the another processing device to substitutionally execute the process relating to the operation button for which the substitute setting is carried out.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF PREFERRED EMBODIMENT

Hereinafter, one or more embodiments of the present invention will be described with reference to the drawings. However, the scope of the invention is not limited to the disclosed embodiments.

Figure 1:
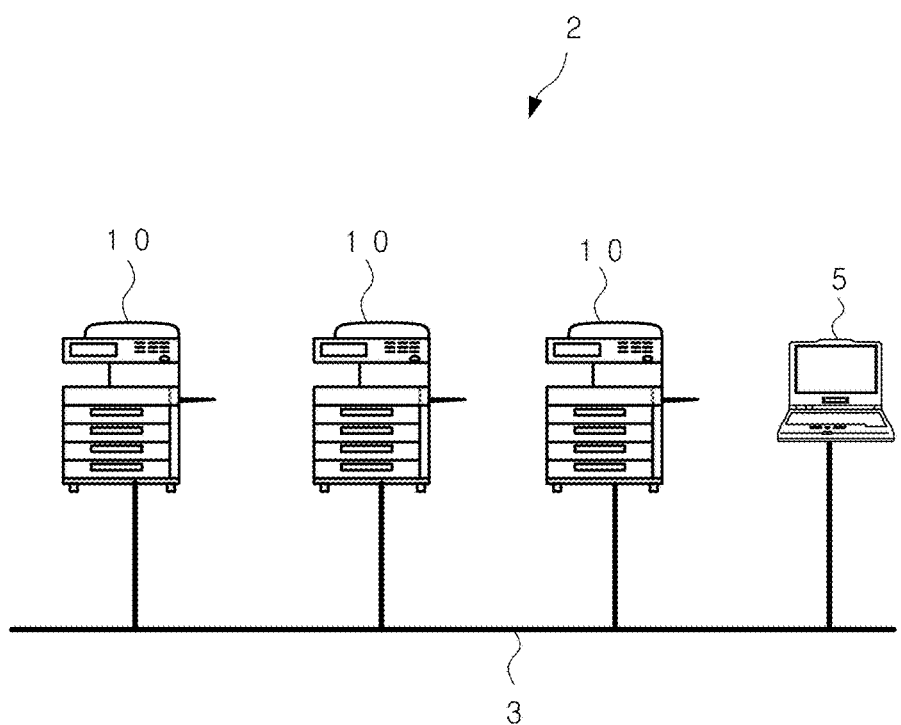
FIG. 1 is a view showing an example of the image forming system including a plurality of processing devices according to the embodiment.

FIG. 1 is a view showing an example of the image forming system 2 including a plurality of processing devices according to the embodiment. In the image forming system 2, a plurality of multi function peripherals 10 as the processing devices according to the embodiment are connected with each other via a network 3, such as LAN (Local Area Network) or the like. Further, a terminal device 5, such as a personal computer or the like, which is used by a user is connected via the network 3.

The multi function peripheral 10 is an image forming apparatus which has a copy function for obtaining image data by optically reading an original using a scanner to print out the image of the original on a recording sheet in accordance with the obtained image data, a scan function for storing the image data obtained by optically reading an original using a scanner as a file or the like and transmitting the image data to an external terminal, a print function for printing out an image on a recording sheet in accordance with the print data received from the terminal device 5 or the like, a facsimile (FAX) function for transmitting/receiving the image data in accordance with the facsimile communication protocol, and the like, and which executes the job relating to each function. Hereinafter, the multi function peripheral 10 is also referred to as MFP.

The image forming system 2 can instruct another multi function peripheral 10 to substitutionally execute a job entered in one multi function peripheral 10 or the process relating to a predetermined function for executing the entered job (referred to as the function substitute). The function substitute can be easily set via the operation panel of the multi function peripheral 10 which is optionally selected from the multi function peripherals 10 connected via the network 3.

Figure 2:
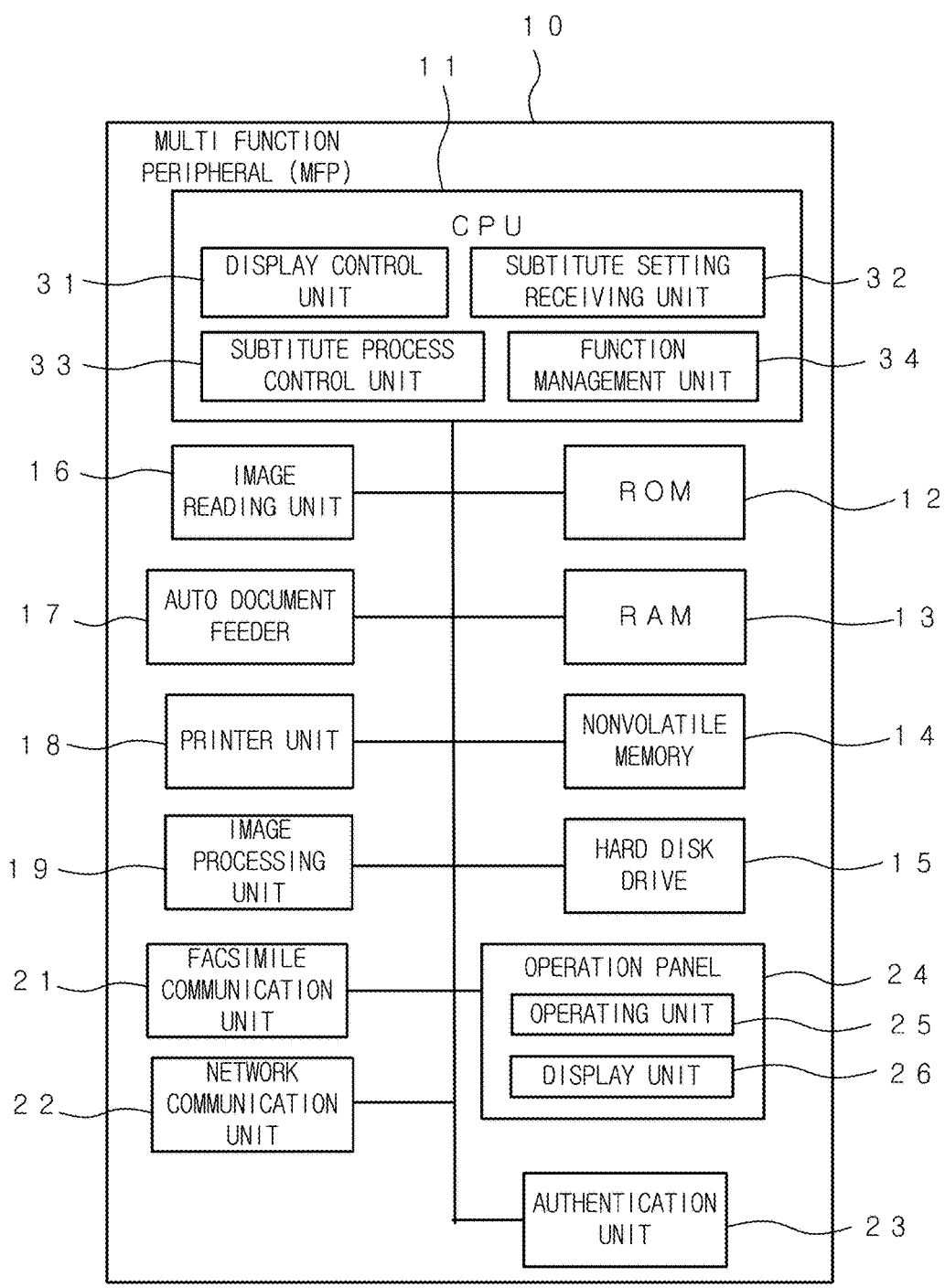
FIG. 2 is a block diagram showing the schematic configuration of the multi function peripheral as the processing device according to the embodiment.

FIG. 2 is a block diagram showing the schematic configuration of the multi function peripheral 10. The multi function peripheral 10 comprises a CPU (Central Processing Unit) 11 for entirely controlling the operation of the multi function peripheral 10. The CPU 11 is connected with a ROM (Read Only Memory) 12, a RAM (Random Access Memory) 13, a nonvolatile memory 14, a hard disk drive 15, an image reading unit 16, an auto document feeder 17, a printer unit 18, an image processing unit 19, a facsimile communication unit 21, a network communication unit 22, an authentication unit 23, an operation panel 24 and the like via a bus.

By the CPU 11, a middleware, application programs and the like are executed on an OS (Operating System) program as a base. In the ROM 12 and the hard disk drive 15, various types of programs are stored. By executing various types of processes by the CPU 11 in accordance with these programs, each function of the multi function peripheral 10 is realized.

The RAM 13 is used as a work memory for temporarily storing various data when the CPU 11 executes the process in accordance with the programs, and as an image memory for storing the image data, and the like.

The nonvolatile memory 14 is a memory (flash memory) in which the stored contents are not damaged even if the multi function peripheral 10 is turned off, and is used for storing various types of settings. The hard disk drive 15 is a large-capacity nonvolatile memory device. In the hard disk drive 15, various types of application programs and data are stored in addition to print data, image data, and the like.

The image reading unit 16 has the function for obtaining image data by optically reading an image of an original. For example, the image reading unit 16 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The auto document feeder 17 has the function for conveying the original by feeding the original set to the original setting tray from the top sheet one by one, passing the original through the reading position of the image reading unit 16 and discharging the original to a predetermined discharge position. The image reading unit 16 has the function for reading the original set on a platen glass, and has the function for sequentially reading the original which is conveyed by the auto document feeder 17.

The printer unit 18 has the function for forming an image on the recording sheet in accordance with the image data. In this embodiment, the printer unit 18 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. Alternatively, an image may be formed by another type of printer.

The image processing unit 19 carries out the rasterizing process for converting print data into image data, the compression/decompression process for the image data, and the like in addition to the processings, such as the enlargement/reduction or the rotation of image data.

The facsimile communication unit 21 has the function for transmitting and receiving the image data to/from an external facsimile device via a public line in accordance with the facsimile communication protocol. The CPU 11 (hardware processor), the image reading unit 16, the auto document feeder 17, the printer unit 18, the image processing unit 19, the facsimile communication unit 21 and the like function as the processing unit for setting a job and executing various types of processes relating to the copy function, the print function, the scan function, the facsimile function and the like.

The network communication unit 22 (communicator) has the function for executing the data communication with other multi function peripherals 10, the terminal device 5, another external device, a server and the like via the network 3.

The authentication unit 23 has the function for authenticating a user who will use the multi function peripheral 10. A user may be authenticated by manually entering a password, an ID and the like, the vein authentication, the authentication using the mobile terminal, or the like.

The operation panel 24 comprises an operating unit 25 and a display unit 26. The display unit 26 has the function for displaying various types of operation windows, setting windows and the like, and comprises a liquid crystal display or the like. The operating unit 25 (operation receiver) receives various types of operations from a user, and comprises various types of hardware keys, such as a start button, a numeric keypad and the like, and a touch screen provided on the display surface of the display unit 26. The touch screen detects the coordinate position on which the touch screen is pressed down by a touch pen, a user's finger or the like. Further, the touch screen detects a flick operation, a drag operation, a drag & drop operation and the like.

The CPU 11 of one multi function peripheral 10 has the function as the display control unit 31, the substitute setting receiving unit 32, the substitute process control unit 33 and the function management unit 34 by executing the programs. The display control unit 31 has the function for obtaining the information for displaying the operation window of another multi function peripheral 10, and arranging and displaying the operation window of the above one multi function peripheral 10 and the operation window of the above another multi function peripheral 10 on the operation panel 24 of the above one multi function peripheral 10. The display control unit 31 has a so-called Web panel function for obtaining the information relating to the function of the above another multi function peripheral 10 and creates the operation window of the above another multi function peripheral 10 in accordance with the obtained information.

When the operation for moving the operation button displayed in the operation window of the above another multi function peripheral 10 to the operation panel of the above one multi function peripheral 10 is received in the situation in which the operation window of the above one multi function peripheral 10 and the operation window of the above another multi function peripheral 10 are arranged and displayed on the operation panel 24, the substitute setting receiving unit 32 carries out the substitute setting for instructing the above another multi function peripheral 10 (the multi function peripheral having the moved operation button) to substitutionally execute the process (function) relating to the operation button moved to the operation window of the above one multi function peripheral 10.

The substitute process control unit 33 controls the image forming system 2 so as to instruct the above another multi function peripheral 10 to substitutionally execute the process relating to the operation button for which the substitute setting is carried out. Specifically, the substitute process control unit 33 divides the job into the pre-processing, the substitute process and the post-processing which will be explained. Further, the substitute process control unit 33 transmits the data necessary for the substitute process and the request for executing the substitute process to the multi function peripheral 10 which will execute the substitute process. The substitute process control unit 33 receives the result of the substitute process from the multi function peripheral 10 which has executed the substitute process, and executes the remaining process by using the result of the substitute process. Further, in case that the substitute process is requested from another multi function peripheral 10, the substitute process control unit 33 executes the requested process and transmits the result of the process to the multi function peripheral 10 which requested the substitute process.

The function management unit 34 manages the functions of the above one multi function peripheral 10, and the process and the functions for which the substitute setting can be carried out. The function management unit 34 transmits the function information indicating the functions of the above one multi function peripheral 10 and the functions for which the substitute setting can be carried out, to the above another multi function peripheral 10. The above another multi function peripheral 10 receiving the function information prepares and displays the operation window of the above one multi function peripheral 10 and judges whether the function substitute can be requested for the above one multi function peripheral 10 in accordance with the received function information. The above one multi function peripheral 10 may display the operation window of the above another multi function peripheral 10 on the operation panel by receiving the window data of the operation window of the above another multi function peripheral 10 from the above another multi function peripheral 10.

Figure 3:
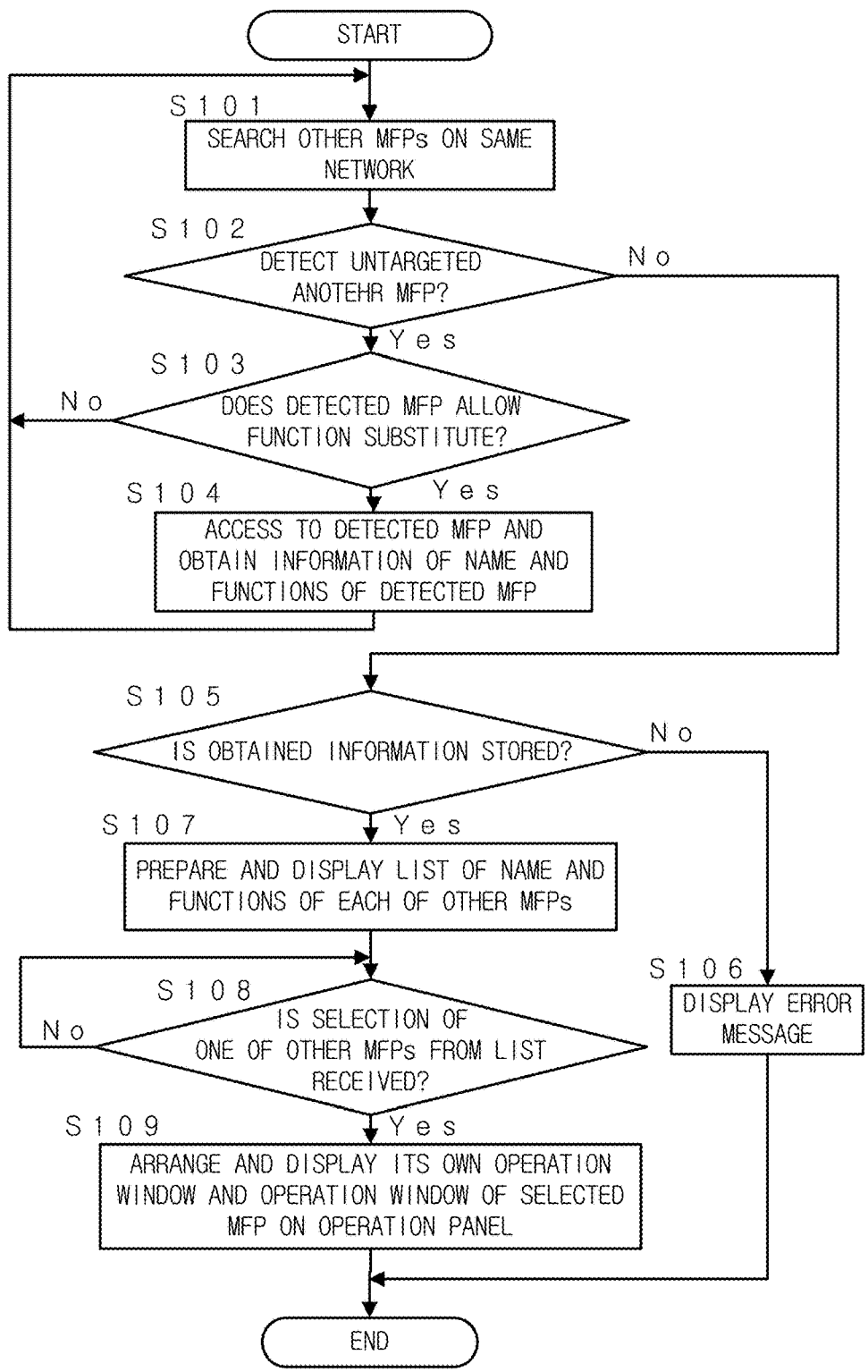
FIG. 3 is a flowchart showing the process for searching other multi function peripherals which are connected with one multi function peripheral on the network and for receiving the selection of one or more multi function peripherals instructed to execute the function substitute.

FIG. 3 is a flowchart showing the process for searching other multi function peripherals 10 which are connected with one multi function peripheral 10 on the network 3 and for receiving the selection of one or more searched multi function peripherals from a user, of which the operation window and the operation window of the above one multi function peripheral 10 are arranged and displayed on the operation panel 24 of the above one multi function peripheral 10. This process is carried out when the request for arranging and displaying the operation windows is received from a user. In this embodiment, the number of the operation window of another multi function peripheral 10, which is arranged and displayed with the operation window of the above one multi function peripheral is only one. However, a plurality of operation windows of other multi function peripherals 10 may be arranged and displayed with the operation window of the above multi function peripheral 10.

Firstly, the CPU 11 of one multi function peripheral 10 searches other multi function peripherals 10 (MFPs) on the network 3 (Step S101). When other multi function peripherals 10 which have not been targeted (not processed) in this process are detected (Step S102; Yes), the CPU 11 targets one of the detected multi function peripherals 10 and judges whether the targeted multi function peripheral 10 allows the function substitute (Step S103). When the multi function peripheral 10 is detected, the information for accessing to the detected multi function peripheral 10 (IP address or the like) is obtained.

When the targeted multi function peripheral 10 allows the function substitute (Step S103; Yes), the above one multi function peripheral 10 accesses to the targeted multi function peripheral 10 and obtains the information indicating the name and the functions of the targeted multi function peripheral 10 to store the obtained information therein (Step S104). Then, the process returns to Step S101. In case that the targeted multi function peripheral 10 does not allow the function substitute (Step S103; No), the process returns to Step S101.

In case that no multi function peripheral 10 which has not been targeted is detected (Step S102; No), that is, in case that there is no other multi function peripheral 10 on the network 3 or in case that all of the multi function peripherals 10 which are detected on the network 3 have been targeted (Step S102; No), it is checked whether the information indicating the name and the functions of each of the other multi function peripherals 10 is stored at Step S104 (Step S105).

In case that the information indicating the name and the functions of each of the other multi function peripherals 10 is not stored (Step S105; No), because there is no other multi function peripheral 10 which allows the function substitute, the above one multi function peripheral 10 displays an error message (Step S106). Then the process is ended.

In case that the information indicating the name and the functions of each of the other multi function peripherals 10 is stored (Step S105; Yes), the above one multi function peripheral 10 prepares a list of the name and the functions of each of the other multi function peripherals 10 which allow the function substitute and displays the prepared list on the operation panel 24 (Step S107). When the operation for selecting one of the other multi function peripherals 10 from the list is received from a user (Step S108; Yes), the above one multi function peripheral 10 arranges and displays its own operation window and the operation window of the multi function peripheral 10 selected at Step S108 on the operation panel 24 (Step S109). Then, the process is ended.

Figure 4:
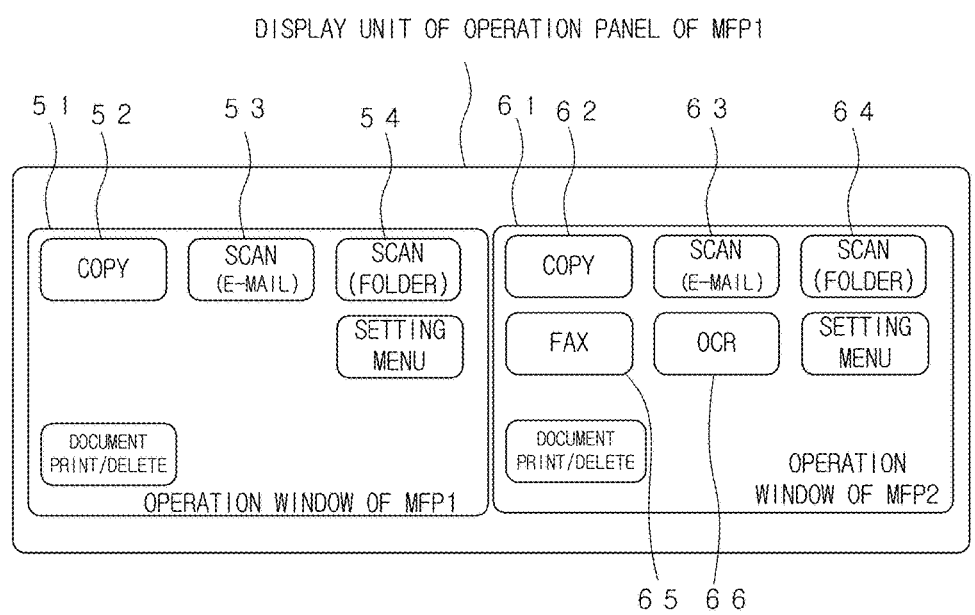
FIG. 4 is a view showing an example of the situation in which the operation window of MFP1 and the operation window of MFP2 are arranged and displayed on the operation panel of MFP1.

FIG. 4 shows an example of the situation in which the operation window 51 of MFP1 and the operation window 61 of MFP2 are arranged and displayed on the operation panel 24 of MFP1. In this example, MFP1 does not have the facsimile function and the OCR (Optional Character Reader) function, and MFP2 has the above two functions. In the operation window 51 of MFP1, the selection button 52 of the copy function, the selection button 53 of the scan function (E-MAIL), the selection button 54 of the scan function (Folder) and the like are displayed. Further, in the operation window 61 of MFP2, the selection button 65 of the facsimile function and the selection button 66 of the OCR function which do not exist in the operation window 51 of MFP1 are displayed in addition to the selection button 62 of the copy function, the selection button 63 of the scan function (E-MAIL) and the selection button 64 of the scan function (Folder) and the like, which are the same as those in the operation window 51 of MFP1. Each selection button (operation button) is an icon.

Figure 5:
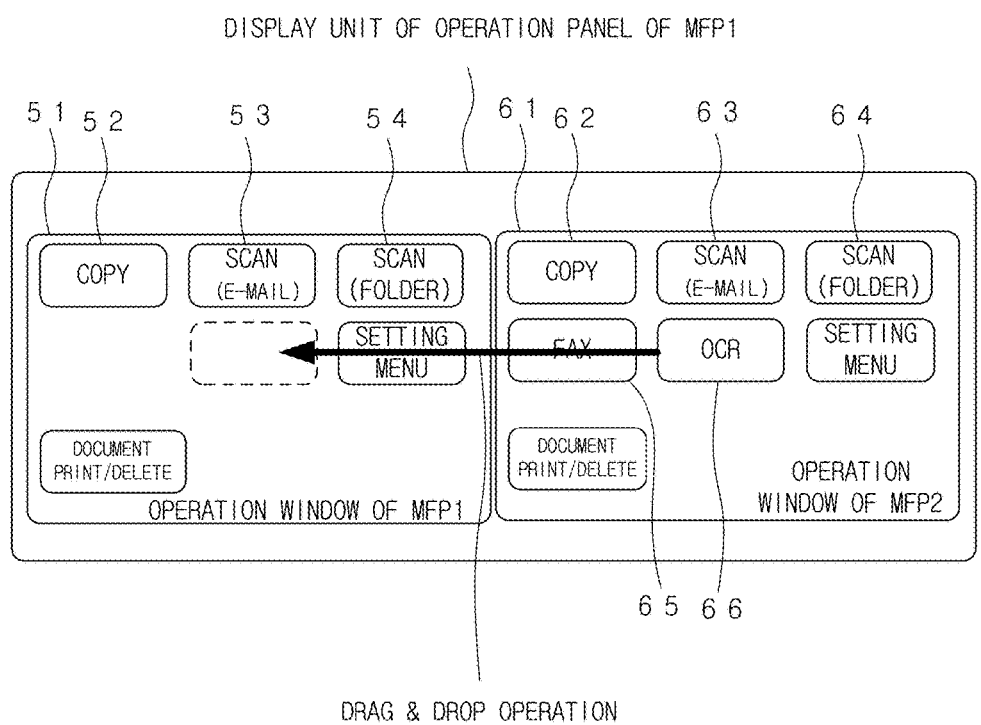
FIG. 5 is a view showing the situation in which the setting operation of the function substitute is received from a user via the operation panel.
Figure 6:
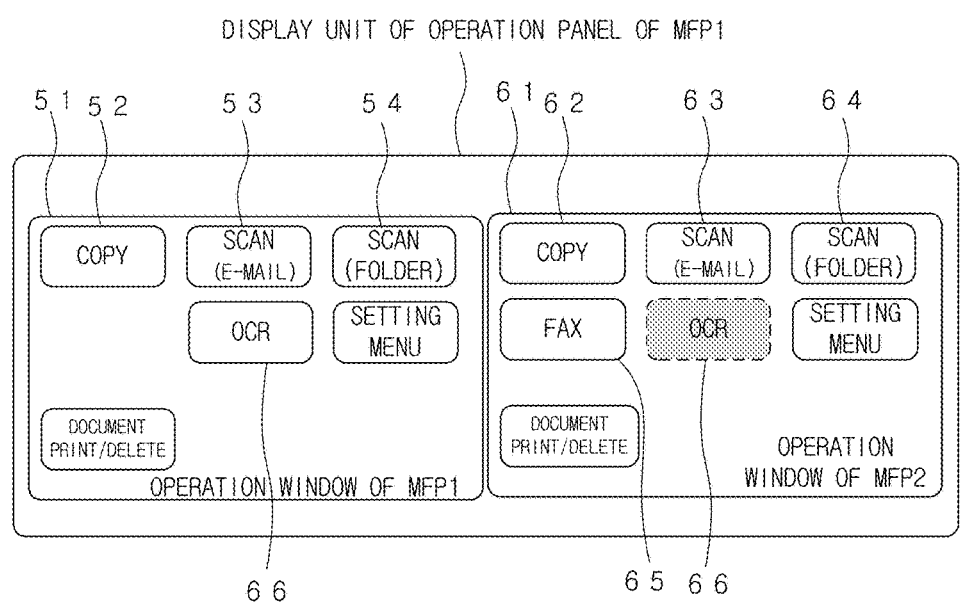
FIG. 6 is a view showing the display situation of the operation panel after the operation shown in FIG. 5 is received (after the setting of the function substitute)

FIG. 5 shows the situation in which the operation for carrying out the substitute setting is received from a user via the operation panel 24. FIG. 6 shows the display situation of the operation panel 24 after the above operation is received (after the substitute setting). In the example of FIG. 5, a user carries out the drag & drop operation for the selection button 66 of the OCR function displayed in the operation window 61 of MFP2. Specifically, a user touches the selection button 66 of the OCR function by using a user's finger, and moves (drags) the selection button 66 to the optional space area in the operation window 51 of MFP1 in the situation in which the selection button 66 is touched by the user's finger. Then, the user carries out the operation (drop) for releasing the user's finger from the selection button 66.

In accordance with the drag & drop operation, the selection button (icon) 66 of the OCR function is moved and the display contents are changed to the situation shown in FIG. 6. That is, the selection button 66 of the OCR function is displayed in the operation window 51 of MFP1. In the operation window 61 of MFP2, the selection button 66 of the OCR function is grayed out or is deleted. As a result, a user cannot carry out the operation for the selection button 66 of the OCR function in the operation window 61 of MFP2.

Only in case that the operation button (icon) of the function which is the same as the function of which the operation button (icon) is moved from the operation window 61 of MFP2 to the operation button 51 of MFP1 does not exist in the operation window 51 of MFP1, the function substitute for the above function can be set. In this case, for example, when the selection button of the OCR function exists in the operation window 51 of MFP1, even though a user attempts to move the selection button 66 of the OCR function to the operation window 51 of MFP1 from the operation window 61 of MFP2 by the drag & drop operation, the operation is refused or invalidated. Alternatively, regardless of whether the operation button (icon) of the function which is the same as the function of which the operation button (icon) is moved from the operation window 61 of MFP2 to the operation button 51 of MFP1 has existed in the operation window 51 of MFP1, the function substitute for the above function may be set.

Figure 7:
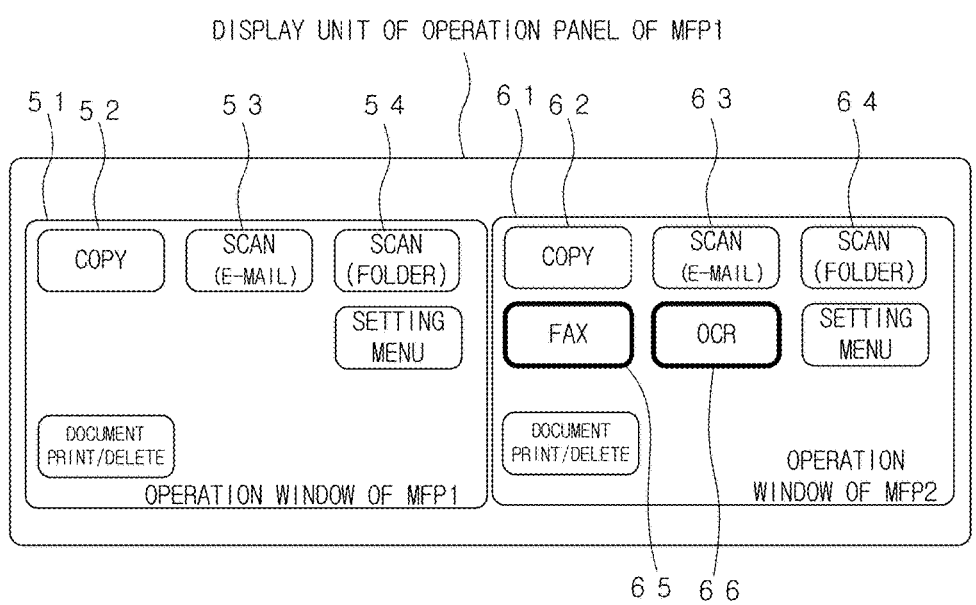
FIG. 7 is a view showing an example of the situation in which the operation button (the selection button of OCR function) which does not exist in the operation window of MFP1 is displayed in the operation window of MFP2 so as to be distinguished from the other operation buttons.

Further, when the operation window 51 of MFP1 and the operation window 61 of MFP2 are arranged and displayed on the operation panel 24, the difference between the operation buttons displayed in the operation window 51 of MFP1 and the operation buttons displayed in the operation window 61 may be clarified. FIG. 7 shows an example of the situation in which the operation buttons which do not exist in the operation window 51 of MFP1 but exist in the operation window 61 of MFP2 (the selection button 65 of the facsimile function and the selection button 66 of the OCR function) are displayed so as to be distinguished from the other operation buttons in the operation window 61 of MFP2. In this example, the operation buttons which do not exist in the operation window 51 of MFP1 but exist in the operation window 61 of MFP2 are distinguished from the other operation buttons in the operation window 61 of MFP2 by enclosing the operation buttons by the bold lines. However, as the method for distinguishing the operation buttons, an optional method may be used. For example, the color of the operation button may be changed.

In the multi function peripheral 10 according to the embodiment, only by carrying out the above-described drag & drop operation, the substitute setting for instructing MFP2 to substitutionally execute the OCR process for the image data of the original and the like read by MFP1 is finished.

Figure 8:
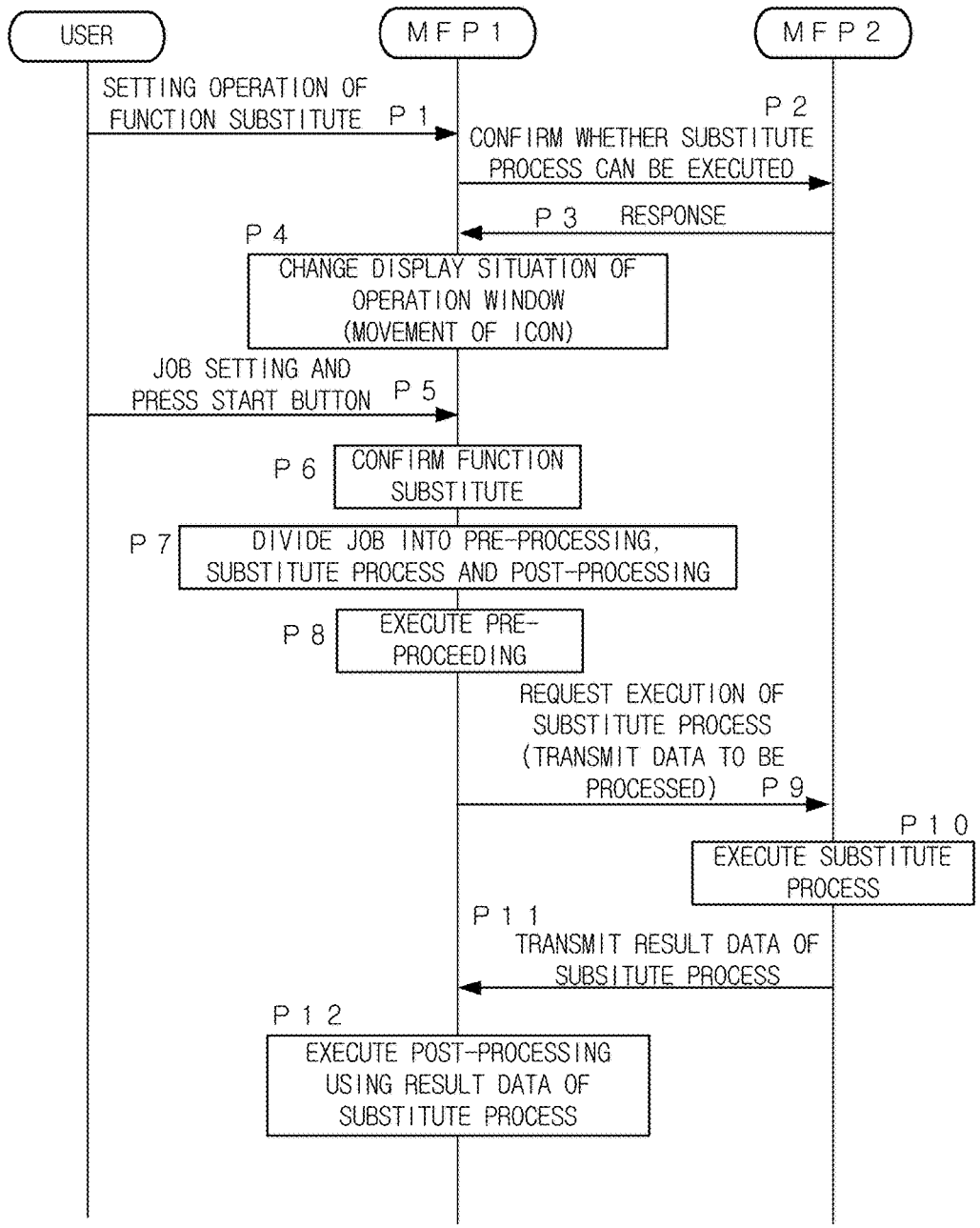
FIG. 8 is a sequence diagram showing the operation which is carried out when the job is executed by setting the function substitute.

FIG. 8 is a sequence diagram showing the operation which is carried out when the function substitute is set and the job is executed. In this sequence, the multi function peripheral 10 which is operated by a user is referred to as MFP1 and the multi function peripheral 10 which is instructed to execute the function substitute is referred to as MFP2. The window shown in FIG. 4 is displayed on the operation window 24 of MFP1.

Firstly, a user carries out the setting operation for setting the function substitute by carrying out the drag & drop operation for the optional operation button which exists in the operation window 61 of MFP2 as shown in FIG. 5 (P1). MFP1 which receives the operation for moving the operation button, inquires of MFP2 whether the substitute process can be executed by the function relating to the operation button which receives the drag & drop operation (P2). MFP2 judges whether the substitute process can be executed by the function relating to the above inquiry and transmits the response indicating the result of the judgment (the substitute process can be executed or not) to MFP1 (P3).

Figure 9:
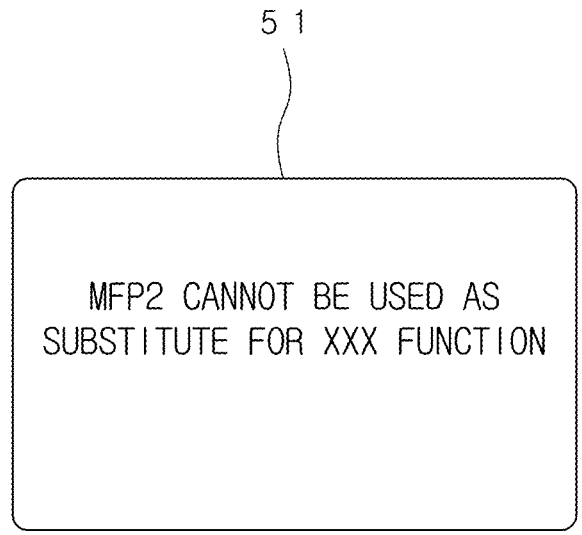
FIG. 9 is a view showing an example of the message indicating the function substitute cannot be executed.

In case that the response indicating that the substitute process cannot be executed is received from MFP2, MFP1 inform a user that MFP2 cannot be used for the function substitute to be executed for the function of which the operation button receives the drag & drop operation. For example, MFP1 displays the message on the operation panel 24 as shown in FIG. 9.

In case that the response indicating that the substitute process can be executed is received from MFP2, MFP1 changes the display situation of the operation panel 24 to the situation shown in FIG. 6 (the situation in which the function substitute has been set) (FIG. 8, P4). Then, the user carries out the operation for entering a job, setting the destination and instructing MFP1 to execute the entered job, for the operation window 51 of MFP1, which is displayed on the operation panel 24 (P5).

When MFP1 receives the operation for entering the job and instructing MFP1 to execute the entered job from the user, MFP1 confirms the process which is substitutionally executed by MFP2 among the process relating to the execution of the job (P6). Then, according to the result of the above confirmation, MFP1 divides the process necessary to execute the entered job into the pre-processing, the substitute process and the post-processing (P7). The pre-processing is the process to be executed by MFP1 before MFP2 is instructed to execute the substitute process. The post-processing is the process to be executed by MFP1 after MFP2 executes the substitute process, and is executed by using the result of the substitute process.

MFP1 executes the pre-processing (P8). Then, MFP1 transmits the request for executing the substitute process and the data to be used for the substitute process (the data to be processed by the substitute process, and the like) to MFP2 (P9). MFP2 which receives the request and the like, executes the requested substitute process (P10), and transmits the data of the result of the substitute process and the like to MFP1 (P11).

MFP1 which receives the data of result of the substitute process, executes the post-processing by using the data of the result of the substitute process, which is received from MFP2 (P12). Thereby, the process for executing the entered job is finished.

In the operation shown in FIG. 8, since MFP2 receives the inquiry relating to the substitute process and transmits the response indicating that the substitute process can be executed (P3) or since MFP2 receives the request for executing the substitute process (P9) until the execution of the substitute process is finished, MFP2 does not accept the entry of the operation and the job relating to the function used in the substitute process by displaying the message indicating that the above function is currently provided for MFP1 or by graying out the operation button relating to the above function in MFP2. Thereby, MFP2 does not use the above function for the execution of the job entered in MFP2.

Figure 10:
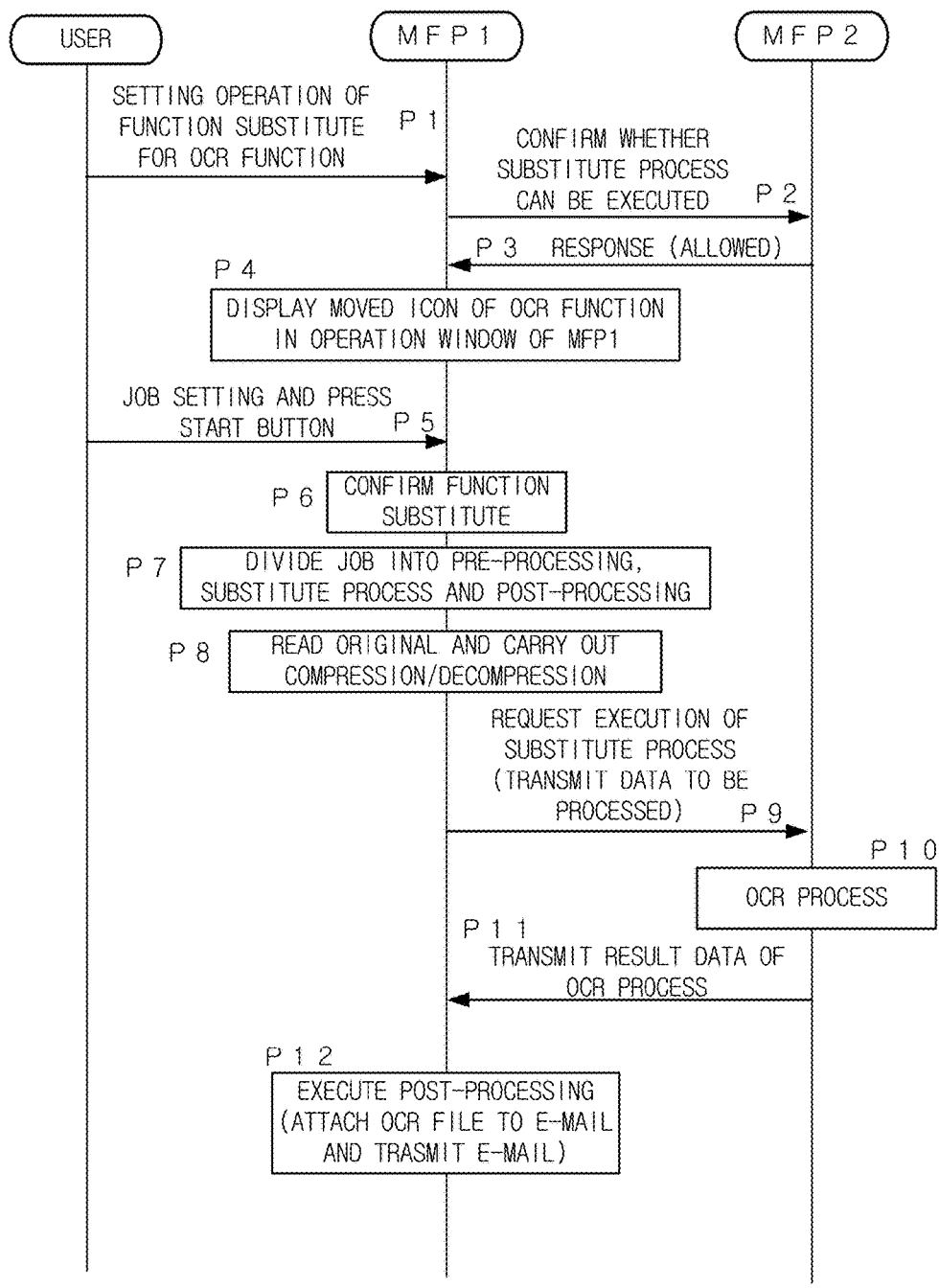
FIG. 10 is a sequence diagram showing the operation which is carried out when the Scan To E-MAIL job including the OCR process is entered after the function substitute for the OCR function is set.

FIG. 10 shows the operation which is carried out when the moved selection button 66 of the OCR function and the selection button 63 of the scan function (E-MAIL) are selected and the Scan To E-MAIL job is entered via the operation window 51 of MFP1 after the function substitute is set for the selection button 66 of the OCN function.

A user carries out the operation for moving the selection button 66 of the OCR function which exists in the operation window 61 of MFP2 to the operation window 51 of MFP1 (drag & drop operation) (P1). MFP1 inquires of MFP2 whether the substitute process relating to the OCR function can be executed (P2), and receives the response indicating whether the substitute process can be executed or not from MFP2 (P3). In this operation shown in FIG. 10, MFP1 receives the response indicating that the substitute process can be executed and displays the situation in which the selection button (icon) 66 of the OCR function is moved to the operation window 51 of MFP1 (P4).

Then, MFP1 receives the operation for pressing down the selection button 66 of the OCR function and the selection button 63 of the scan function (E-MAIL) from the user. Further, the Scan To E-Mail job is entered (P5).

MFP1 confirms the setting condition of the function substitute (P6) and divides the entered job into the pre-processing for reading the original set on the auto document feeder 17, the substitute process for executing the OCR process for the data obtained by reading the original and the post-processing for preparing and transmitting the electronic mail in which the data of the result of the OCR process is attached (P7).

Then, MFP1 executes the pre-processing. That is, MFP1 reads the original set on the auto document feeder 17, and prepares the data to be transmitted to MFP2 and to be processed by MFP2, by carrying out the compression/decompression process and the like for the image data obtained by reading the original (P8). MFP1 transmits the data to be processed to MFP2 and requests MFP2 to substitutionally execute the OCR process (P9).

MFP2 executes the OCR process for the data received from MFP1 (P10), and transmits the data of the result of the OCR process to MFP1 (P11). As the post-processing, MFP1 prepares the electronic mail in which the data of the result of the OCR process, which is received from MFP2 is attached as a file, and transmits the prepared electronic mail to the designated destination (P12).

Figure 11:
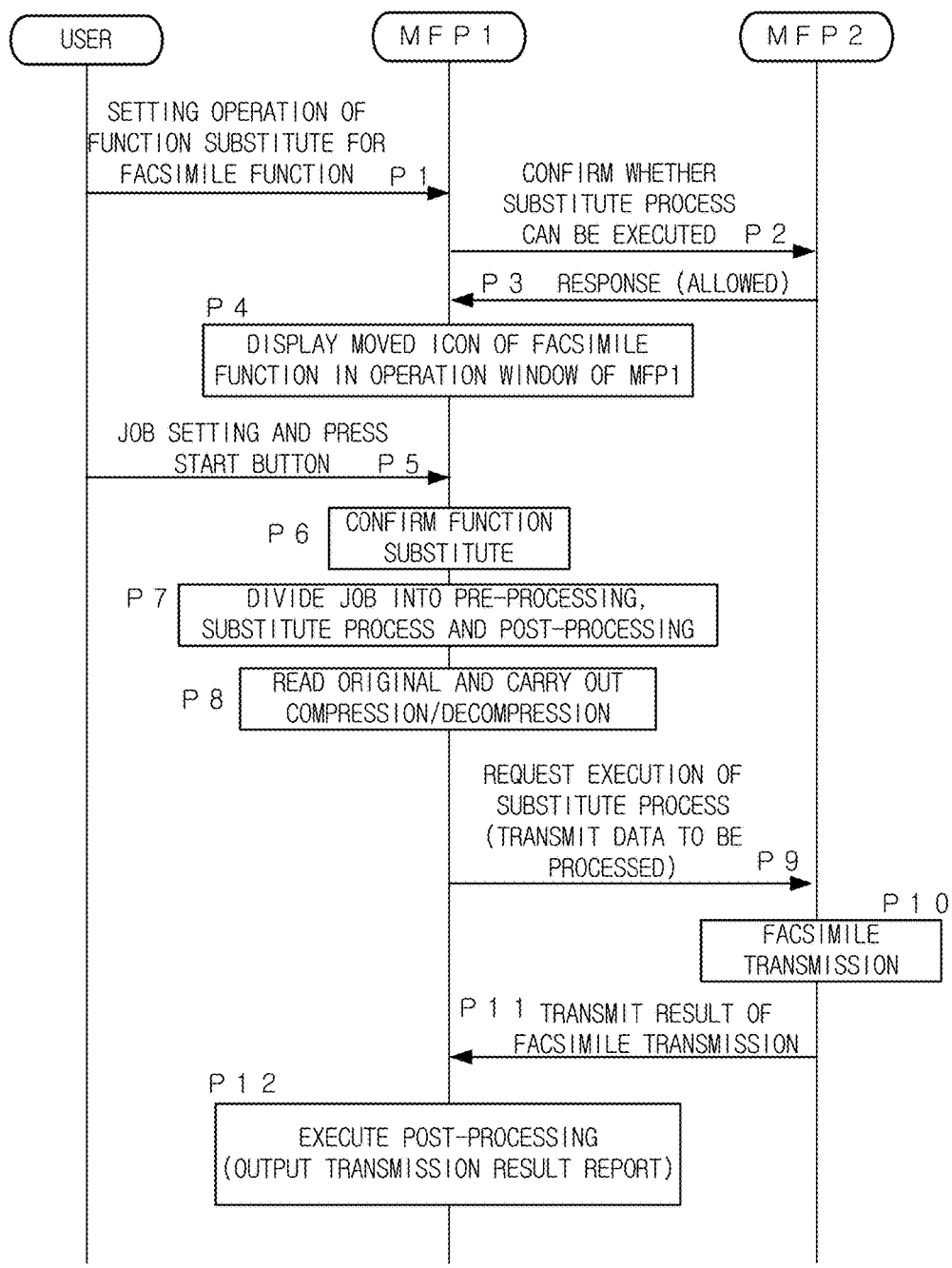
FIG. 11 is a sequence diagram showing the operation which is carried out when the facsimile transmission job is entered after the function substitute for the facsimile transmission function is set.

FIG. 11 shows the operation which is carried out when the selection button 65 of the facsimile function is selected and the facsimile transmission job is entered via the operation window 51 of MFP1 after the function substitute is set for the selection button 65 of the facsimile function (See FIG. 4).

A user carries out the operation for moving the selection button 65 of the facsimile function which exists in the operation window 61 of MFP2 to the operation window 51 of MFP1 (drag & drop operation) (P1). MFP1 inquires of MFP2 whether the substitute process relating to the facsimile function can be executed (P2), and receives the response indicating whether the substitute process can be executed or not from MFP2 (P3). In this operation shown in FIG. 11, MFP1 receives the response indicating that the substitute process can be executed and displays the situation in which the selection button (icon) 65 of the facsimile function is moved to the operation window 51 of MFP1 (P4).

Then, MFP1 receives the operation for pressing down the moved selection button 65 of the facsimile function from the user. Further, the facsimile transmission job is entered (P5).

MFP1 confirms the setting condition of the function substitute (P6) and divides the entered job into the preprocessing for reading the original set on the auto document feeder 17, the substitute process for executing the facsimile transmission for the image data obtained by reading the original to the predetermined destination and the post-processing for outputting the transmission result report (P7).

Next, MFP1 executes the pre-processing. That is, MFP1 reads the original set on the auto document feeder 17, and prepares the data to be transmitted to MFP2 and to be processed by MFP2, by carrying out the compression/decompression process and the like for the image data obtained by reading the original (P8). MFP1 transmits the data to be processed and the destination information to MFP2, and requests MFP2 to substitutionally execute the facsimile transmission process (P9).

MFP2 executes the facsimile transmission for the data to be processed, which is received from MFP1, to the designated destination (P10), and transmits the data of the result of the facsimile transmission (the information indicating the normal termination, the error termination and the like of the facsimile transmission) to MFP1 (P11). MFP1 prepares and prints out the transmission result report in accordance with the data of the result of the facsimile transmission, which is received from MFP2, as the post-processing (P12).

As described above, among the function relating to the operation button for which the substitute setting is carried out (in this example, the facsimile transmission function), the process which can be executed by MFP1 (in this example, the reading of the original and the output of the transmission result report), is executed by MFP1, and the process which cannot be executed by MFP1 (the process for transmitting the image data to the destination in accordance with the facsimile protocol), is substitutionally executed by MFP2. Therefore, it is possible to reduce the processing load of MFP2 which is instructed to execute the substitute process. Among the function (process) relating to the operation button for which the substitute setting is carried out, at least the process which cannot be executed by MFP1 may be executed by MFP2. Further, a part of or all of the process which can be executed by MFP1 may be also executed by MFP2.

Next, the case in which the result obtained by instructing another multi function peripheral 10 to substitutionally execute the process relating to the operation button for which the function substitute is set is output to another multi function peripheral 10, will be explained.

In case of the substitute process relating to the OCR function or the substitute process relating to the facsimile transmission function as described above, it is not necessary that a user who enters the job in MFP1 goes to MFP2 in order to fetch the result of the job. However, according to the function used in the substitute process, there are some cases in which the result of the job is output to another multi function peripheral 10.

For example, there are some cases in which after the original is copied, a user wants to execute the post-processing, such as the punching, the folding, the binding (staple) and the like, for the output document. However, in case that the multi function peripheral which copies the original does not have the post-processing function, another multi function peripheral is instructed to execute the post-processing. In this case, one multi function peripheral reads the original and then it is necessary that another multi function peripheral is instructed to print out the document and execute the post-processing for the output document. Therefore, the result of the copy job is output to another multi function peripheral 10.

Therefore, in case that by executing the function substitute, the result of the process is output to the multi function peripheral 10 which is instructed to execute the substitute process, the image forming system 2 executes the following operation.

(1) Even though the operation for moving the intended operation button (the operation for setting the function substitute) is received, the function substitute is not set for the intended operation button. For example, the operation for moving the operation button is refused or invalidated. Alternatively, the message indicating that because the result is output to the multi function peripheral 10 which is instructed to execute the substitute process, the function substitute is not accepted, is displayed. Thereby, the setting of the function substitute is not accepted.

(2) The setting of the function substitute is accepted. However, the message and/or the warning indicating that the result of the process is output to another multi function peripheral 10 by the function substitute, is displayed. For example, the specific warning mark is displayed on the moved operation button. Alternatively, the message for prompting a user to go to the multi function peripheral which is instructed to execute the substitute process to fetch the result of the process, is displayed.

Figure 12:
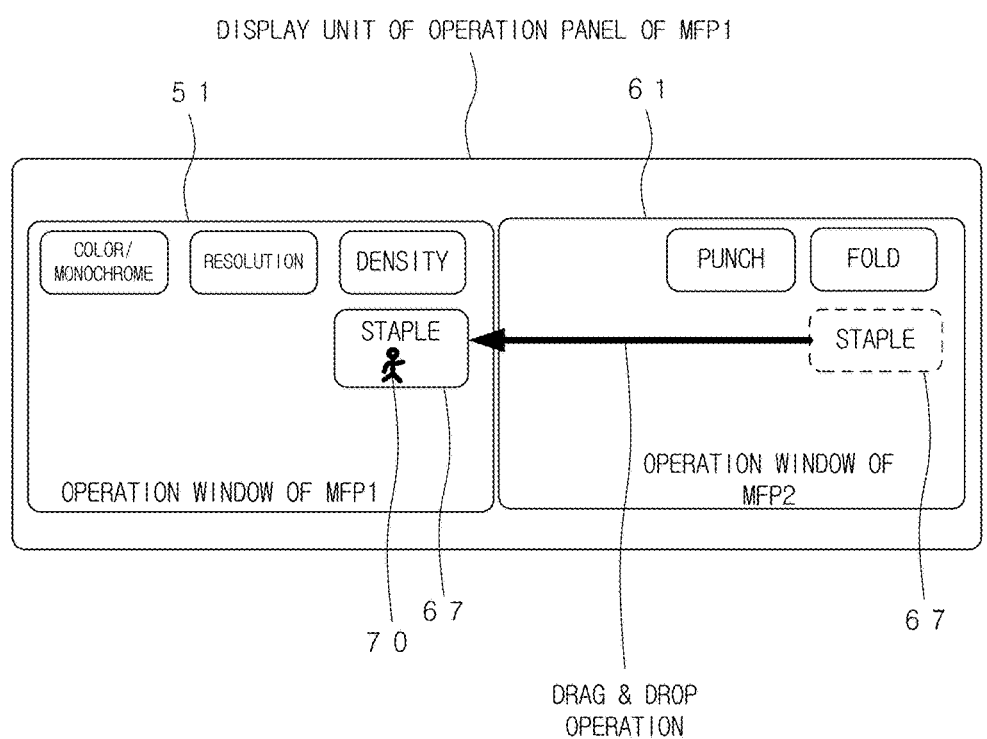
FIG. 12 is a view showing the display situation in case that the selection button of the staple function is moved from the operation window of MFP2 to the operation window of MFP1.

FIG. 12 shows the display situation in case that the selection button 67 of the staple function is moved from the operation window 61 of MFP2 to the operation window 51 of MFP1. In the operation button 67 of the staple function, which is moved to the operation window 51 of MFP1, the warning mark 70 which is not attached to the operation button 67 of the staple function before the operation button 67 is moved, is displayed. In the example shown in FIG. 12, the warning mark 70 indicates that it is necessary to go to the multi function peripheral 10 which is instructed to execute the substitute process to fetch the result of the process, by the design indicating that a person moves.

Figure 13:
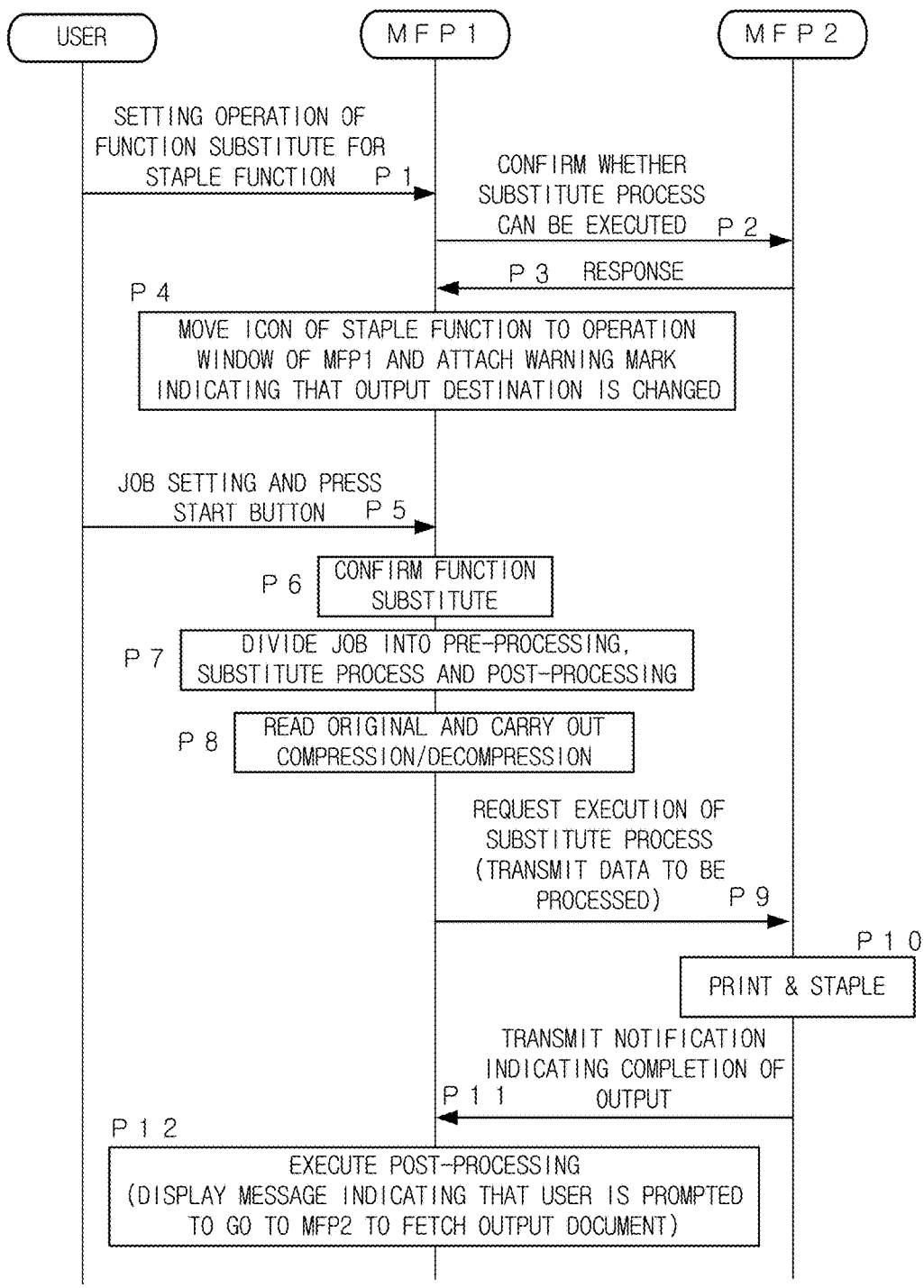
FIG. 13 is a sequence diagram showing the operation which is carried out when the copy job including the setting for carrying out the stapling is entered after the function substitute for the staple function is set.

FIG. 13 shows the operation which is carried out when the selection button 67 of the staple function and the selection button 62 of the copy function are selected and the copy job is entered via the operation window 51 of MFP1 after the function substitute is set for the selection button 67 of the staple function.

A user carries out the operation for moving the selection button 67 of the staple function which exists in the operation window 61 of MFP2 to the operation window 51 of MFP1 (drag & drop operation) (P1). MFP1 inquires of MFP2 whether the substitute process relating to the staple function can be executed (P2), and receives the response indicating whether the substitute process can be executed or not from MFP2 (P3). In this operation shown in FIG. 13, MFP1 receives the response indicating that the substitute process can be executed and displays the selection button (icon) 67 of the staple function in which the warning mark 70 is attached, in the operation window 51 of MFP1 (P4).

Then, MFP1 receives the operation for pressing down the selection button 67 of the staple function and the selection button 62 of the copy function from the user. Further, the copy job including the post-processing is entered (P5).

MFP1 confirms the setting condition of the function substitute (P6) and divides the entered job into the pre-processing for reading the original set on the auto document feeder 17, the substitute process for printing out the document in accordance with the image data obtained by reading the original and for binding the printed document by the staple, and the post-processing for displaying the message indicating that the user is prompted to go to the multi function peripheral which is instructed to execute the substitute process to fetch the printed document (P7).

Next, MFP1 executes the pre-processing. That is, MFP1 reads the original set on the auto document feeder 17, and prepares the data to be transmitted to MFP2 and to be processed by MFP2, by carrying out the compression/decompression process and the like for the image data obtained by reading the original (P8). MFP1 transmits the data to be processed to MFP2 and requests MFP2 to substitutionally print out the document in accordance with the data to be processed and execute the process for stapling the printed document (P9).

Figure 14:
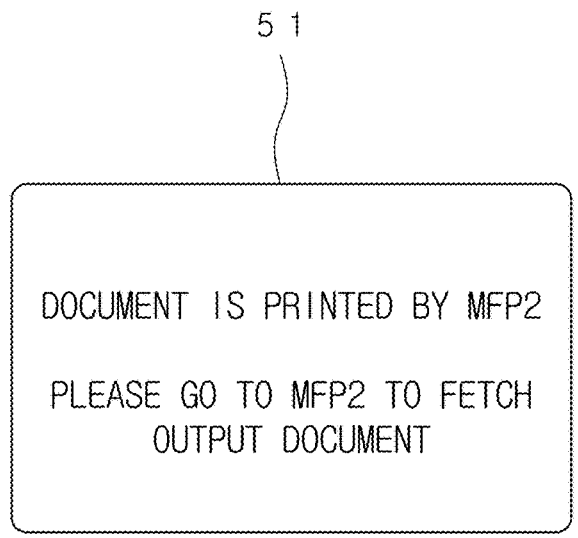
FIG. 14 is a view showing an example of the message indicating that a user is prompted to go to the multi function peripheral which prints out the document and fetch the printed document.

MFP2 executes the substitute process for printing out the document in accordance with the data to be processed, which is received from MFP1 and for stapling the printed document (P10). After the substitute process is finished, MFP2 transmits the notification indicating the completion of output of the document to MFP1 (P11). MFP1 which receives the notification displays the message indicating that the user is prompted to go to MFP2 to fetch the document output by the copy job, in the operation window 51 of MFP1 (P12). FIG. 14 shows an example of the above message.

The case in which the result of the process is output to the multi function peripheral which is instructed to execute the substitute process, is not limited to the case in which the substitute process relating to the function for executing the post-processing for the printed document is substitutionally executed. For example, in case that one device is a scanner and another device is a printer, when the copy function is realized by moving the printer button displayed in the operation window of the printer to the operation window of the scanner and pressing down the scan button for scanning the original and the moved printer button, the result of the process is output to the device which is instructed to execute the substitute process (the printer).

Next, as the substitute function, the case in which the information stored in another multi function peripheral 10 is referred, will be explained.

Figure 15:
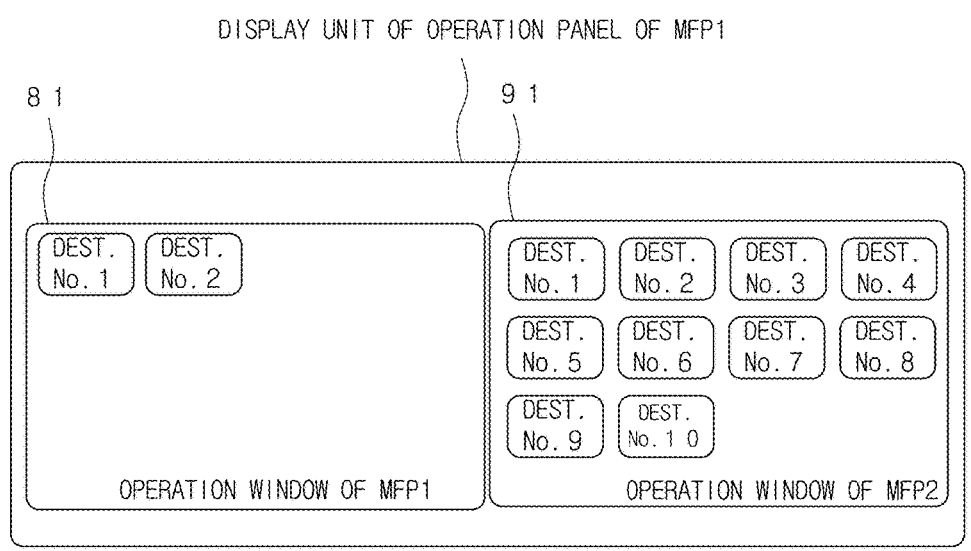
FIG. 15 is a view showing an example of the situation in which the destination selection window of MFP1 and the destination selection window of MFP2 are arranged and displayed on the operation panel of MFP1.
Figure 16:
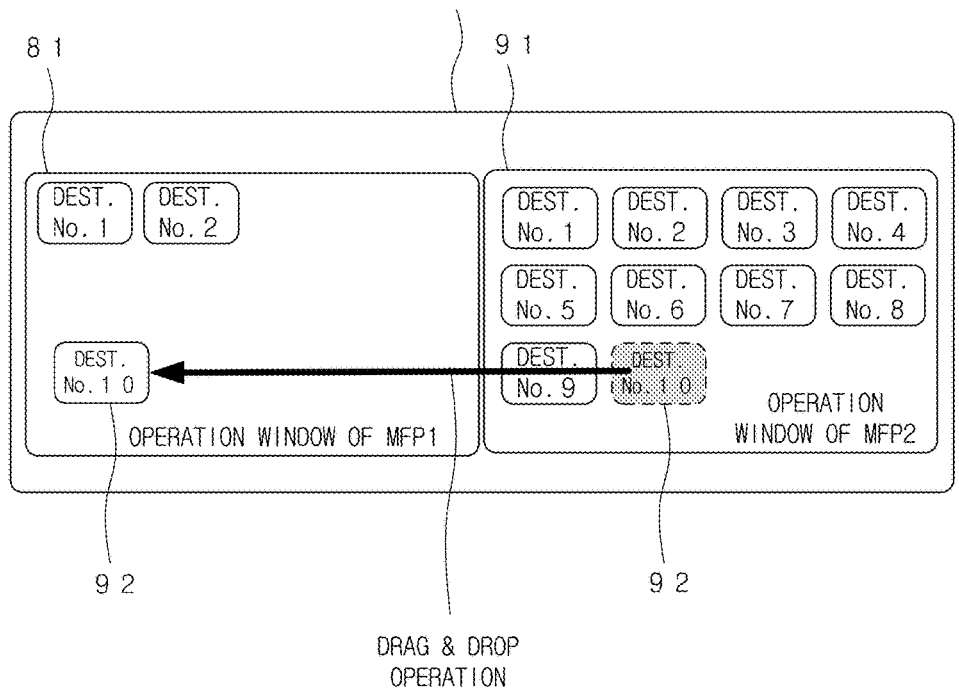
FIG. 16 is a view showing the situation in which the destination selection button is moved from the destination selection window of MFP2 to the destination selection window of MFP1 by the drag & drop operation.

For example, in the situation in which the destination selection window 81 of MFP1 and the destination selection window 91 of MFP2 are arranged and displayed on the operation panel 24 of MFP1 as shown in FIG. 15, when any one of the destination selection button displayed in the destination selection window 91 of MFP2 (in this example, the destination selection button 92 indicating "DEST. No. 10") is moved to the destination selection window 81 of MFP1 by the operation, such as the drag & drop operation or the like as shown in FIG. 16, the destination information stored in the MFP2 so as to be related to the moved destination selection button can be used in MFP1. For example, when the destination selection button 92 indicating "DEST. No. 10" is moved, the DEST. No. 10 can be set to the destination of the facsimile transmission or the like, in MFP1.

When the destination selection button for which the substitute setting is carried out is selected, MFP1 refers the destination information stored in MFP2 so as to be related to the selected destination selection button by obtaining the destination information from MFP2, and uses the destination information as the destination of the facsimile transmission or the like.

Figure 17:
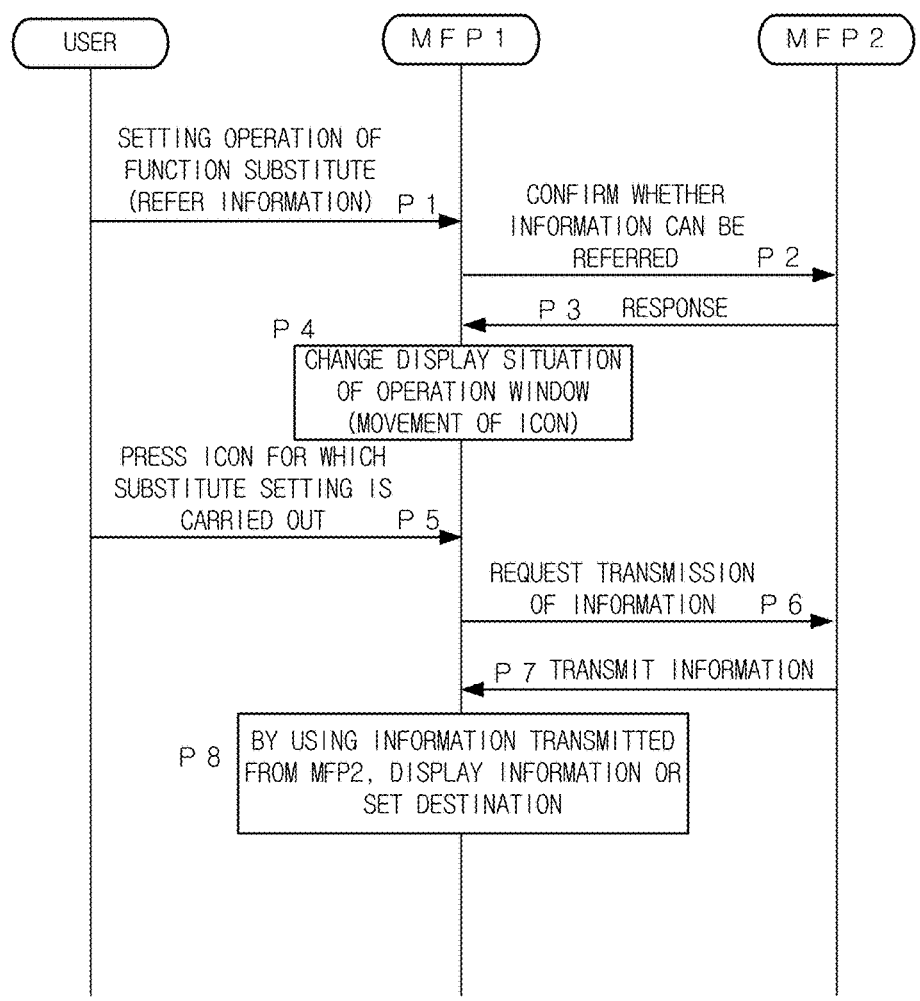
FIG. 17 is a sequence diagram showing the operation which is carried out when the information stored in another multi function peripheral is referred as the substitute function.

FIG. 17 shows the operation which is carried out when the information stored in another multi function peripheral 10 is referred as the substitute function.

A user carries out the operation for moving any one of the destination selection buttons displayed in the destination selection window 91 of MFP2 to the destination selection window 81 of MFP1 (drag & drop operation) (P1). MFP1 inquires of MFP2 whether the information related to the destination selection button which receives the above operation can be referred (P2), and receives the response indicating whether the information can be referred or not from MFP2 (P3).

In case that the response indicating that the information cannot be referred is received, MFP1 displays the message indicating that the information of this destination selection button cannot be referred and refuses the movement of this destination selection button.

In case that the response indicating that the information can be referred is received, MFP1 moves the destination selection button which receives the above operation to the destination selection window 81 of MFP1 and displays the moved destination selection button (P4).

When MFP1 receives the operation for pressing down the destination selection button for which the substitute setting is carried out, from a user (P5), MFP1 transmits the request for obtaining the information stored in MFP2 so as to be related to the above destination selection button, to MFP2 (P6). MFP2 which receives the above request, transmits the information related to the pressed destination selection button to MFP1 if the above information is stored in MFP2 (P7). MFP1 executes the process relating to the operation for pressing down the destination selection button by using the information transmitted from MFP2 (P8). For example, the destination information corresponding to the pressed destination selection button is displayed or is set to the destination of the facsimile transmission.

The information to be referred is not limited to the destination described above, and may be optional information stored in another multi function peripheral 10. For example, in case that the substitute setting is carried out by carrying out the operation for moving the selection button for designating the file stored in the box of MFP2, from the operation window of MFP2 to the operation window of MFP1, MFP1 can obtain the file stored in MFP2 from MFP2 to transmit or print out the obtained file by operating the selection button for which the substitute setting is carried out via the operation window of MFP1.

As described above, in the multi function peripheral 10 according to the embodiment, the operation window of the multi function peripheral 10 and the operation window of another multi function peripheral 10 are arranged and displayed on the operation panel 24 of the multi function peripheral. Only by moving the icon displayed in the operation window of another multi function peripheral 10 to the operation window of the multi function peripheral 10 using the drag & drop operation or the like, it is possible to carry out the substitute setting for instructing another multi function peripheral 10 to substitutionally execute the process relating to the function corresponding to the moved operation button. Thereby, it is possible to use the function or the information of another multi function peripheral 10 by a simple operation without providing a special server or without carrying out the previous setting by an administrator.

When the function substitute is set, the operation button for which the function substitute is set is displayed with the other operation buttons in the operation window of the multi function peripheral. Therefore, only by carrying out the operation, such as the entry of the job, the setting of the destination or the like via the operation window of the multi function peripheral as usual, it is possible to instruct another processing device to substitutionally execute process relating to the function corresponding to the operation button for which the substitute setting is carried out. As a result, it is possible to provide the high operability for a user.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, a drag & drop operation is carried out for an icon as the operation for setting the function substitute. However, the operation except the drag & drop operation can be carried out as the operation for setting the function substitute. For example, the operation button may be moved from the operation window of MFP2 to the operation window of MFP1 by a flick operation. Alternatively, after an optional operation button is selected via the operation window 61 of MFP2, another operation button for moving the selected operation button to the operation window of MFP1 may be pressed down.

In this embodiment, the multi function peripheral 10 is explained as an example of the processing device. The processing device is not limited to this, and may be an image processing device, such as a printer, a scanner, a facsimile device, a copier and the like. The process device may be an optional device which has an operation window and executes the predetermined process related to the operation button displayed in the operation window in accordance with the operation for the operation button. Further, the present invention is applied to the program for operating an information processing device.

In this embodiment, only by arranging and displaying the operation window of one processing device and the operation window of another processing device on the operation panel of one processing device and by carrying out the operation for moving the operation button displayed in the operation window of another processing device to the operation window of one processing device in this situation, it is possible to carry out the substitute setting for instructing another processing device to substitutionally execute the process relating to the moved operation button.

In this embodiment, the operation button which does not exist in the operation window of one processing device but exists in the operation window of another processing device is displayed so as to be distinguished from the operation button which exists in both of the operation window of one processing device and the operation window of another processing device.

In this embodiment, when the operation for carrying out the substitute setting for the predetermined function is received, it is confirmed whether another processing device can substitutionally execute the process relating to the predetermined function. In case that another processing device cannot substitutionally execute the process relating to the predetermined function, the substitute setting is not carried out. Only in case that another processing device can substitutionally execute the process relating to the predetermined function, the substitute setting is carried out.

In this embodiment, for example, in case that another processing device is instructed to substitutionally execute the process relating to the staple function for binding the printed document by the stapling, it is necessary to output the result of the process (the printed document) to another processing device. Therefore, the substitute setting for the above staple function is refused.

In this embodiment, for example, in case that another processing device is instructed to substitutionally execute the process relating to the staple function for binding the printed document by the stapling, it is necessary to output the result of the process (the printed document) to another processing device. Therefore, in case that the substitute setting for the above staple function is carried out, the processing device displays the message indicating that the result of the process is output to another processing device or warns a user that the result of the process is output to another processing device.

In this embodiment, in case that another processing device is instructed to substitutionally execute the process, the function which causes the result of the process to be output to another processing device is a function for carrying out the post-processing for the printed document, such as punching, binding, folding and the like.

In this embodiment, by moving the operation button for selecting the information stored in another processing device from the operation window of another processing device to the operation window of one processing device, one processing device can refer and use the information stored in another processing device and relating to the moved operation button.

In this embodiment, for example, it is possible to set the destination by referring the address book registered in another processing device.

In this embodiment, one processing device executes all of or a part of a process which can be executed by one processing device among the process relating to the operation button for which the substitute setting is carried out, and instructs another processing device to execute a process which cannot be executed by one processing device among the process relating to the operation button for which the substitute setting is carried out. For example, in case that the substitute setting is carried out for the operation button of the facsimile transmission button, one processing device reads the original and instructs another processing device to substitutionally execute the process for transmitting the image data of the original to the designated destination.

In this embodiment, one processing device executes the substitute process which is requested from another processing device.

According to the processing device, the non-transitory recording medium storing a computer readable program and the substitute process setting method, it is possible to instruct another device to substitutionally execute a process relating to the intended function by a simple operation.

Although embodiments of the present invention have been described and illustrated in detail, it is clearly understood that the same is by way of illustration and example only and not limitation, the scope of the present invention should be interpreted by terms of the appended claims.

What is claimed is:

1. A processing device, comprising:
   an operation panel having a display and an operation receiver;
   a communicator that communicates with another processing device via a network; and
   a hardware processor that:
   executes a designated process;
   obtains information for displaying an operation window of the another processing device, and displays an operation window of the processing device and the operation window of the another processing device on the operation panel of the processing device so as to arrange the operation window of the processing device and the operation window of the another processing device;
   carries out a substitute setting for instructing the another processing device to substitutionally execute a process relating to an operation button moved to the operation window of the processing device when an operation for moving the operation button displayed in the operation window of the another processing device to the operation window of the processing device is received in a situation in which the operation window of the processing device and the operation window of the another processing device are arranged and displayed on the operation panel of the processing device; and
   instructs the another processing device to substitutionally execute the process relating to the operation button for which the substitute setting is carried out.

2. The processing device of claim 1, wherein among the operation buttons displayed in the operation window of the another processing device, the hardware processor displays the operation button which does not exist in the operation window of the processing device so as to be distinguished from the operation button which exists in both of the operation window of the processing device and the operation window of the another processing device.

3. The processing device of claim 1, wherein when the operation for moving the operation button displayed in the operation window of the another processing device to the operation window of the processing device is received in the situation in which the operation window of the processing device and the operation window of the another processing device are arranged and displayed on the operation panel of the processing device, the hardware processor confirms whether the process relating to the operation button moved to the operation window of the processing device can be substitutionally executed by the another processing device, and
   only in case that the process relating to the operation button moved to the operation window of the processing device can be substitutionally executed by the another processing device, the hardware processor carries out the substitute setting for instructing the another processing device to execute the process relating to the operation button.

4. The processing device of claim 1, wherein in case that a result obtained by instructing the another processing device to substitutionally execute the process relating to the operation button which receives the operation for moving the operation button is output to the another processing device, the hardware processor does not carry out the substitute setting for instructing the another processing device to execute the process relating to the operation button.

5. The processing device of claim 1, wherein in case that in case that a result obtained by instructing the another processing device to substitutionally execute the process relating to the operation button which receives the operation for moving the operation button is output to the another processing device, the hardware processor displays a message indicating that the result of the process relating to the operation button is output to the another processing device and/or warns a user that the result of the process relating to the operation button is output to the another processing device.

6. The processing device of claim 4, wherein the result is a printed document, and
   in case that the hardware processor instructs the another processing device to substitutionally execute the process relating to the operation button which receives the operation for moving the operation button, the process in which the result is output to the another processing device is a post-processing which is executed for the printed document.

7. The processing device of claim 5, wherein the result is a printed document, and
   in case that the hardware processor instructs the another processing device to substitutionally execute the process relating to the operation button which receives the operation for moving the operation button, the process in which the result is output to the another processing device is a post-processing which is executed for the printed document.

8. The processing device of claim 1, wherein in case that the operation button for which the substitute setting is carried out is an operation button for selecting specific information stored in the another processing device, the hardware processor obtains the specific information from the another processing device and refers the obtained specific information as the substitute setting for instructing the another processing device to substitutionally execute the process relating to the operation button.

9. The processing device of claim 8, wherein the operation button for selecting the specific information is an operation button for designating a destination or data to be processed.

10. The processing device of claim 1, wherein in case that an instruction for executing the process relating to the operation button for which the substitute setting is carried out is received, the hardware processor executes all of or a part of a process which can be executed by the processing device among the process relating to the operation button for which the substitute setting is carried out, and instructs the another processing device to execute at least a process which cannot be executed by the processing device among the process relating to the operation button for which the substitute setting is carried out.

11. The processing device of claim 1, wherein the operation button is an icon, and
   the operation for moving the operation button is a drag & drop operation for moving the icon.

12. The processing device of claim 1, wherein the processing device executes the process which is requested from the another processing device.

13. A non-transitory recording medium storing a computer readable program causing an information processing device to operate as the processing device of claim 1.

14. A substitute process setting method, comprising:
obtaining information for displaying an operation window of a second processing device by a first processing device comprising an operation panel having a display and an operation receiver, a communicator that communicates with the second processing device via a network and a hardware processor that executes a designated process, the second processing device being connected with the first processing device via the network, and;
displaying an operation window of the first processing device and the operation window of the second processing window on the operation panel of the first processing device so as to arrange the operation window of the first processing device and the operation window of the second processing device; and
carrying a substitute setting for instructing the second processing device to substitutionally execute a process relating to an operation button moved to the operation window of the first processing device when an operation for moving the operation button displayed in the operation window of the second processing device to the operation window of the first processing device is received in a situation in which the operation window of the first processing device and the operation window of the second processing device are arranged and displayed on the operation panel of the first processing device.

* * * * *